Patented Dec. 22, 1953

2,663,632

UNITED STATES PATENT OFFICE 2,663,632

REDUCTION OF IRON ORES

Assur Gjessing Oppegaard, Fredrikstad, Norway, assignor to National Lead Company, New York, N. Y., a corporation of New Jersey No Drawing. Application September 6, 1951, Serial No. 245,435

Claims priority, application Norway March 6, 1951

5 Claims. (Cl. 75—33)

The difficulties which arise when iron ore is reduced to above 80% degree of reduction (metallic iron, calculated on total iron) is described in U. S. Patent No. 2,523,138 and the advantages of reducing to less than 80% but at least 50% are pointed out. In this patent it is mentioned that the unreduced iron (FeO) during the subsequent magnetic separation accompanies the metallic iron to a substantial degree, so that it is sufficient to reduce the ore to between 50 and 80% degree of reduction to obtain a satisfactory magnetic separation. In some cases, however, it may be desirable to reduce the material further to obtain nearly 100% degree of reduction in the concentrate.

It is therefore the object of this invention to provide a method for low temperature reduction of iron ore to produce a higher degree of reduction than heretofore found to be economically and practically obtainable. A further object of this invention is to provide a process for such reduction of iron ore in which most efficient utilization of coal, and other reducing media is obtained. These and other objects of the invention will be apparent from the following complete description thereof.

It has now been discovered that such further reduction can be carried out without technical difficulties by means of gas reduction during cooling of the product which has been reduced with coke. Reduction of iron ore by means of coke, is usually carried out at about between 900° C. to 1100° C. or preferably about 1000° C. or slightly below, and the reduced material may leave the furnace at a temperature of about 1000° C. Reduction by means of gas, on the other hand, may advantageously take place at a lower temperature, for instance at 900° C. or still lower, for instance at 800° C. and 700° C. If hot solid material from the coke reduction at 1000° C. is allowed to meet reducing gas, the heat of the solid material will be utilized in the subsequent gas reduction.

It has been proposed that iron ore be reduced by means of coke in a rotary furnace and that reducing gas be introduced at the discharge end of the furnace. By such an arrangement, it is not, however, possible to run coke reduction and gas reduction independently of each other. In order that the gas reduction may be conducted as desired, this step should preferably be carried out in a separate apparatus independently of the coke reduction, but the degree of reduction in the two different operations may be kept in a certain relation to each other.

When iron ore is reduced in blast furnace, gas reduction will first take place as the material passes down through the furnace and eventually reduction with solid carbon and smelting of iron and slag take place. The rising gases will consequently cause some reduction in the higher part of the furnace, but the gas reduction cannot be carried so far that the gas is fully utilized as reducing agent. It is usually only possible to utilize 25–50% of the reducing components of the gas for reducing purposes. When the gases leave the blast furnace, they will therefore still contain a substantial part of the reducing components and are consequently combustible (blast furnace gas).

It will be apparent that the procedure of the present invention will be, in a sense, the opposite of the one in a blast furnace, a reduction is first carried out with solid fuel, i. e., coke or coal, and subsequently the material is transferred to another furnace where gas reduction is carried out. The gases from the gas reduction furnace may pass directly into the coke reduction furnace and be fully burnt there, and thereby be directly utilized as fuel in the coke reduction. The gases introduced at the discharge end of the coke reduction furnace will also prevent re-oxidation of the reduced product from this furnace.

Coke oven gas and so-called illuminating gas (city gas) which have approximately the same composition, are particularly suitable for such gas reduction and are cheap. If cheap hydrogen is available, this may also be used with advantage. Water gas may also be employed. It is also possible to use producer gas, but this gas is not very suitable for the purpose as it contains a large amout of nitrogen and also some carbon dioxide, which counteract reduction in the gas reduction furnace.

The heat balance in gas reduction of iron ore shows that reduction by carbon monoxide is a slightly exothermic reaction, while reduction with hydrogen is a slightly endothermic reaction. If, therefore, coke oven gas containing about 60% hydrogen and 5–10% carbon monoxide, is employed, the reduction may be taken as being slightly endothermic. The heat which is consumed during reduction by such gas in the present process, is taken from the hot product discharged from the coke reduction furnace, the product having a temperature of about 1000° C. During gas reduction the material is cooled from about 1000° C. to, for instance, about 600° C., the heat liberated being utilized to cover the endothermic reaction, heating of the gas and heat losses. Calculations of heat balances show that if the degree of reduction from the coke reduction furnace is about 70% (metallic iron, calculated on total iron), a further reduction to about 90% may easily be carried out in the gas reduction furnace without any other supply of heat than that present in the material coming from the coke reduction furnace. When a product of 90% degree of reduction is crushed and subjected to magnetic separation, a concentrate of 95% degree of reduction or more will usually be obtained.

If the coke for the coke reduction furnace is produced by coking of coal near the reduction plant, coke oven gas will be at hand and the consumption of gas in the gas reduction furnace and coke in the coke reduction furnace may easily be balanced out. It is thereby possible to utilize the spent gases from the gas reduction furnace in the coke reduction furnace where they are completely burnt and all the heat values thereby recovered.

It will be understood that the difficulties which are encountered in a coke reduction furnace by reduction to above 80% degree of reduction, will not arise in the gas reduction furnace according to the invention, as the temperature here decreases as the degree of reduction increases. If, for instance, the material leaves the coke reduction at a temperature of 1000° C. and with a degree of reduction of about 70%, the temperature of the material in the gas reduction furnace will immediately begin to sink and will reach, for instance, 850° C. when the degree of reduction has reached about 80% and a temperature of about 700° C. when the degree of reduction is about 90% and the material is ready to leave the furnace.

Above figures regarding the degree of reduction of the material from the coke reduction furnace and the gas reduction furnace, will vary according to the circumstances. It may be desirable to carry the reduction in the coke reduction furnace towards 80% and consequently less work will have to be carried out in the gas reduction furnace. If, however, large amounts of gas are readily available, a greater part of the reduction may be carried out in the gas reduction furnace than mentioned above, but it is then generally necessary on account of the heat balance, to pre-heat the gas before it enters the gas reduction furnace. This may easily be accomplished, and pre-heating of the gas to 200° C. up to about 500° C. is not difficult and provides slightly better reduction. For this pre-heating, the exit gases from the gas reduction furnace may partly be used, whereby these are completely burnt. The pre-heating, however, should be to such a degree that the necessary cooling of the furnaced material is obtained.

The gas reduction may be carried out either in shaft furnace or in multiple-hearth furnace with rabble arms, as the Wedge type or in other furnaces, preferably of the stationary type. If the reduction in the coke reduction furnace is carried out with sized ore, for instance with the fraction plus 3 mm. and minus 25 mm. or plus 15 mm. and minus 30 mm., these fractions may go from the coke reduction furnace to a shaft furnace, and the gas reduction may be carried out in the latter by introducing the gas at the bottom of the furnace and the material at the top. As the ore is sized beforehand, the charge will be fairly open, and the gas may therefore easily pass through the furnace and accomplish its reduction as it passes from the bottom upward. The finer fractions, for instance minus 5 mm. or minus 3 mm., will usually not give the necessary porosity in a shaft furnace for gas reduction and for such material it is advantageous to use a multiple-hearth furnace with rabble arms. The material will then go from hearth to hearth, the gas will be introduced at the bottom and meet the hot ore, reduce this and leave at the top as in a shaft furnace. The tendency of the material during reduction to sinter will decrease with decreasing temperature and the decreasing temperature will consequently counteract the tendency to sinter when the degree of reduction increases.

When the gas meets the material in countercurrent as described, the strongest reducing gas will meet the most reduced ore, which is advantageous.

As an illustration of the operation of the process, the following example is shown:

*Example*

A charge of iron ore having the following analysis

|  | Per cent |
|---|---|
| Iron (total Fe) | 36.8 |
| SiO$_2$ | 45.8 |
| S | .014 | was admixed with coke in a ratio of 3 parts of ore to 1 part of coke. The ore had been crushed to between 15 mm. and 3 mm. size and the coke was finer than 5 mm.

The mixture was heated in a rotary kiln to a temperature of 1000° C. until 70% of the iron content of the ore had been reduced to metallic state. The temperature of the reduced ore discharged from the kiln was about 1000° C. and this was transferred without cooling to a shaft furnace and coke oven gas introduced at the bottom of the furnace passing upward through the charge. The coke oven gas was obtained from a previous operation in which coal was converted to coke for admixture with the original ore. No external heat was applied; the temperature in the charge being sufficient to promote the further reduction of the iron in the charge by the reducing action of the coke oven gas which contains an appreciable percentage of reducing agents such as hydrogen. The material discharged from the shaft furnace at a temperature of about 600° C. and contained 90% of its total iron content reduced to metallic state.

It will be understood that the tendency to reoxidize, which may be considerable for a material at a temperature of 1000° C., will be counteracted by the gas reduction carried out, as the product from the gas reduction will leave the furnace at a temperature of about 600° or 700° C. The product may be discharged from this furnace directly into water and thereby any re-oxidization of the metallic iron may be avoided. When the reducing gas leaves the gas reduction furnace and is transferred to the coke reduction furnace, air for combustion of the reducing gases left may be introduced into the furnace as described in U. S. Patent No. 2,523,138. In this case the reduction gases may be completely burnt in the coke reduction furnace and leave this without any content of reducing, combustible components.

It will be understood that the process described will permit a complete utilization of the combustible components of the coal, i. e., the gases as well as the coke, and a high degree of reduction and a high heat efficiency will be obtained as the exit gases are completely burnt and the product leaves the last reduction furnace at a low temperature, for instance 600° or 700° C. or possibly still lower (as pre-heating of the gases may be carried out by means of the hot ore which leaves the furnace).

Therefore, the reducing gases in the second reduction step act in a dual capacity that is as a reducing medium and also as a cooling medium. Under these conditions, the most efficient utilization of the reducing media is obtained, and the available heat values in the materials are recovered to the fullest possible extent.

While this invention has been described and illustrated by the example shown, it is not intended to be limited strictly thereto and other variations and modifications may be employed within the limits of the following claims.

I claim:

1. A process for reduction of iron ores which comprises admixing comminuted iron ore with a solid reducing agent and heating said mixture to a temperature of between 900° C. to 1100° C. until from 50% to 80% of the iron content of said ore is reduced to metallic iron and subsequently treating said ore while still hot with a reducing gas in a separate furnace without addition of external heat to further reduce the iron content thereof and also to cool the reduced material.

2. Process according to claim 1 in which the reducing gases are pre-heated and introduced at a temperature of between 200° C. to 500° C.

3. Process according to claim 1 in which the reduction with solid reducing agent is carried on until from 70 to 80% of the iron content of the ore has been reduced to metallic state and the further reduction with gaseous reducing agent is carried on until about 90% of the iron content has been reduced to metallic state.

4. Process according to claim 1 in which coal is converted to coke in a coke oven to provide coke for the first reduction step and the coke oven gases produced in the conversion of coal to coke are employed in the second reduction step.

5. Process according to claim 1 in which the spent gases from the second reduction step are burnt in the first reduction step.

ASSUR GJESSING OPPEGAARD.

References Cited in the file of this patent

UNITED STATES PATENTS

| Number | Name | Date |
| --- | --- | --- |
| 1,403,576 | Stansfield | Jan. 17, 1922 |
| 2,296,522 | Hartley | Sept. 22, 1942 |

FOREIGN PATENTS

| Number | Country | Date |
| --- | --- | --- |
| 77,683 | Sweden | Sept. 23, 1930 |

OTHER REFERENCES

Powder Metallurgy, Its Physics and Production, page 26. Edited by Schwarzkopf. Published in 1947 by the Macmillan Co., New York.